(12) United States Patent
Hancock

(10) Patent No.: US 11,813,905 B2
(45) Date of Patent: Nov. 14, 2023

(54) APPARATUSES AND LOCKING ELEMENTS INCLUDING ASSIST DEVICES

(71) Applicant: Truck Shields, LLC, Salt Lake City, UT (US)

(72) Inventor: Dennis H. Hancock, Evanston, WY (US)

(73) Assignee: Truck Shields, LLC, Salt Lake City, UT (US)

(*) Notice: Subject to any disclaimer, the term of this patent is extended or adjusted under 35 U.S.C. 154(b) by 0 days.

(21) Appl. No.: 17/454,601

(22) Filed: Nov. 11, 2021

(65) Prior Publication Data

US 2022/0063359 A1 Mar. 3, 2022

Related U.S. Application Data

(63) Continuation of application No. 17/132,808, filed on Dec. 23, 2020, which is a continuation of application
(Continued)

(51) Int. Cl.
*B60D 1/36* (2006.01)
*B60D 1/58* (2006.01)
(Continued)

(52) U.S. Cl.
CPC ............... *B60D 1/36* (2013.01); *B25B 27/08* (2013.01); *B60D 1/02* (2013.01); *B60D 1/58* (2013.01); *B25B 27/20* (2013.01); *B25G 1/102* (2013.01); *B60D 1/025* (2013.01); *B60D 1/52* (2013.01); *F16B 21/12* (2013.01); *Y10T 29/53943* (2015.01)

(58) Field of Classification Search
CPC . Y10T 29/53943; Y10T 16/476; B60D 1/025; B60D 1/36; B60D 1/02; B60D 1/58; B60D 1/52; B25B 27/08; B25B 27/20; B25G 1/102; F16B 21/12
See application file for complete search history.

(56) References Cited

U.S. PATENT DOCUMENTS 767,156 A    8/1904  Lemos
872,180 A   11/1907  Hite
(Continued)

FOREIGN PATENT DOCUMENTS

CN    302787205         4/2014
DE    2710842 A1        9/1978
(Continued)

OTHER PUBLICATIONS

Pin Whiz, Rhino Hitch website 2022, site visited Jul. 2, 2022, https://rhinohitch.com/products/pin-wiz?variant=36191009570977& currency= US D&utm_med i um =product . . .
(Continued)

*Primary Examiner* — Mahdi H Nejad
(74) *Attorney, Agent, or Firm* — Dorsey & Whitney LLP

(57) ABSTRACT

A pin assist device that eliminates the need to use a separate tool to insert and/or extract a cotter, or other fastening, pin. The pin assist device allows the user to easily insert or extract a pin in locations that are difficult to reach, in all types of weather and virtually all conditions. Related pin assist devices, hitch pins, and hitch pin assemblies are also disclosed.

15 Claims, 10 Drawing Sheets

Related U.S. Application Data

No. 15/718,366, filed on Sep. 28, 2017, now Pat. No. 10,906,368, which is a continuation-in-part of application No. 15/418,442, filed on Jan. 27, 2017, now abandoned.

(60) Provisional application No. 62/344,902, filed on Jun. 2, 2016.

(51) Int. Cl.
*B60D 1/02* (2006.01)
*B25B 27/08* (2006.01)
*B60D 1/52* (2006.01)
*B25G 1/10* (2006.01)
*B25B 27/20* (2006.01)
*F16B 21/12* (2006.01)

(56) References Cited

U.S. PATENT DOCUMENTS

| | | | |
|---|---|---|---|
| 1,119,807 | A | 12/1914 | Carter |
| 1,280,756 | A | 10/1918 | Kelecom |
| 1,429,353 | A | 9/1922 | Karsky |
| 1,562,521 | A * | 11/1925 | Schlegel ............ B60N 3/02 105/354 |
| RE16,820 | E | 12/1927 | Estwing |
| 1,849,605 | A | 3/1932 | Whitlock |
| 1,916,856 | A * | 7/1933 | Copeman ............ D06F 55/00 446/72 |
| 2,166,614 | A | 7/1939 | Strid |
| D118,329 | S | 12/1939 | Crowley |
| 2,400,960 | A | 5/1946 | Strid |
| 2,588,731 | A | 3/1952 | Kabanuck |
| 2,593,935 | A * | 4/1952 | Sweat ............ B25B 27/08 29/247 |
| 2,796,661 | A | 6/1957 | Tuttle |
| 3,151,512 | A | 10/1964 | Walter |
| 3,728,775 | A | 4/1973 | Hosbach |
| 3,807,002 | A | 4/1974 | Green |
| 3,937,442 | A | 2/1976 | Martin et al. |
| D241,806 | S | 10/1976 | Johnson |
| 4,037,513 | A | 7/1977 | Hobson |
| 4,087,112 | A | 5/1978 | Lee |
| 4,172,523 | A | 10/1979 | Weglage |
| 4,298,212 | A | 11/1981 | Jamison |
| D263,788 | S | 4/1982 | McKinnon et al. |
| D270,517 | S | 9/1983 | Raskin |
| 4,412,464 | A | 11/1983 | Cook |
| D276,787 | S | 12/1984 | Burns |
| D278,203 | S | 4/1985 | Braukmann |
| D278,436 | S | 4/1985 | Storlie |
| 4,526,396 | A | 7/1985 | Mayer |
| 4,541,311 | A | 9/1985 | Trammell |
| D281,389 | S | 11/1985 | Summers |
| 4,553,737 | A | 11/1985 | Yi |
| 4,555,125 | A | 11/1985 | Goodlove |
| D284,935 | S | 8/1986 | Shaw |
| 4,624,619 | A | 11/1986 | Uher |
| 4,671,528 | A * | 6/1987 | Thompson ............ B60D 1/02 24/DIG. 37 |
| D294,330 | S | 2/1988 | Keck |
| 4,765,037 | A * | 8/1988 | Perry ............ A61J 17/00 24/301 |
| 4,773,805 | A | 9/1988 | Krahling |
| D298,711 | S | 11/1988 | Lowance |
| 4,840,528 | A | 6/1989 | Doom |
| 4,890,854 | A | 1/1990 | Hoover |
| D306,144 | S | 2/1990 | Haggstrom |
| D308,620 | S | 6/1990 | Baca |
| D318,406 | S | 7/1991 | Gabriele |
| D320,542 | S | 10/1991 | McCord |
| 5,090,277 | A * | 2/1992 | Spiller ............ A43C 11/1433 81/488 |
| 5,150,504 | A * | 9/1992 | Cohen ............ A45F 5/02 24/3.13 |
| 5,205,144 | A * | 4/1993 | Montano ............ E05B 17/14 70/455 |
| 5,267,494 | A | 12/1993 | Waluda |
| D356,763 | S | 3/1995 | Herrick |
| 5,509,380 | A | 4/1996 | Tipp |
| 5,524,511 | A | 6/1996 | Taka |
| 5,557,832 | A | 9/1996 | Vanden |
| 5,662,446 | A | 9/1997 | Haan |
| D386,056 | S | 11/1997 | Streeter |
| D389,624 | S | 1/1998 | Drimmie et al. |
| 5,784,760 | A * | 7/1998 | Leitzke ............ F16G 11/10 24/3.13 |
| D396,885 | S | 8/1998 | Shyu |
| D401,969 | S | 12/1998 | Ho |
| D405,019 | S | 2/1999 | Neuman |
| 5,979,015 | A | 11/1999 | Tamaribuchi |
| 6,145,866 | A | 11/2000 | Peter |
| 6,409,152 | B1 | 6/2002 | Bagley |
| D480,283 | S | 10/2003 | Brown |
| D497,576 | S | 10/2004 | Wang |
| 6,837,807 | B1 | 1/2005 | Kerr |
| 7,131,657 | B1 * | 11/2006 | Witt ............ B62K 27/12 280/204 |
| D535,181 | S | 1/2007 | Roychowdhury |
| 7,306,275 | B2 | 12/2007 | Kalous |
| D560,565 | S | 1/2008 | Kalous |
| D570,257 | S | 6/2008 | Vanderburgh et al. |
| 7,644,485 | B2 | 1/2010 | Muller et al. |
| D650,785 | S | 12/2011 | Terwilliger et al. |
| 8,201,844 | B1 | 6/2012 | Smoot |
| 8,240,695 | B1 * | 8/2012 | Liu ............ B60D 1/01 280/503 |
| 8,267,420 | B2 | 9/2012 | Merten et al. |
| 8,388,366 | B2 | 3/2013 | Yang |
| D681,439 | S | 5/2013 | Chen |
| D693,660 | S | 11/2013 | Hackett et al. |
| 8,677,574 | B1 | 3/2014 | Thiessen et al. |
| 8,764,587 | B2 | 7/2014 | Sinanis et al. |
| D713,709 | S | 9/2014 | Goldman et al. |
| 8,873,921 | B2 | 10/2014 | Lee et al. |
| D719,822 | S | 12/2014 | Van |
| D724,914 | S | 3/2015 | Tipp |
| 9,090,136 | B2 | 7/2015 | Breeden et al. |
| 9,151,907 | B2 | 10/2015 | Jiang et al. |
| D749,994 | S | 2/2016 | Verboeket |
| D754,512 | S | 4/2016 | Nelson |
| 9,669,276 | B1 | 6/2017 | Maloy |
| D796,307 | S | 9/2017 | Smith et al. |
| D797,009 | S | 9/2017 | Verboeket |
| D810,517 | S | 2/2018 | Singer |
| D823,415 | S | 7/2018 | Zwart |
| D847,037 | S | 4/2019 | Hancock |
| 10,906,368 | B2 | 2/2021 | Hancock |
| D931,719 | S | 9/2021 | Hancock |
| D942,334 | S | 2/2022 | Wang |
| D943,468 | S | 2/2022 | Wang |
| D945,945 | S | 3/2022 | Hu |
| D949,064 | S | 4/2022 | Kyeong |
| D955,302 | S | 6/2022 | Moore et al. |
| D962,131 | S | 8/2022 | Wen |
| D962,832 | S | 9/2022 | Huang |
| D963,525 | S | 9/2022 | Smith |
| D964,222 | S | 9/2022 | Zhou |
| D964,223 | S | 9/2022 | Olaru |
| D967,741 | S | 10/2022 | Wyers |
| D971,090 | S | 11/2022 | Campanella |
| 2004/0164516 | A1 * | 8/2004 | Baginski ............ B60D 1/62 280/420 |
| 2005/0262677 | A1 | 12/2005 | Tanaka et al. |
| 2006/0078374 | A1 | 4/2006 | Wrase et al. |
| 2006/0147297 | A1 | 7/2006 | Wrase et al. |
| 2007/0007782 | A1 | 1/2007 | Kalous |
| 2007/0062006 | A1 | 3/2007 | Wright |
| 2007/0087920 | A1 * | 4/2007 | Dachraoui ............ A63B 21/0552 482/121 |
| 2007/0251059 | A1 | 11/2007 | You |
| 2009/0044847 | A1 | 2/2009 | Barangan |

(56) References Cited

U.S. PATENT DOCUMENTS

| | | | |
|---|---|---|---|
| 2009/0089972 A1 | 4/2009 | Gill et al. | |
| 2009/0115166 A1* | 5/2009 | Goettker | B60D 1/60 |
| | | | 280/511 |
| 2009/0163300 A1 | 6/2009 | Lueders | |
| 2009/0181808 A1 | 7/2009 | Tate | |
| 2009/0278334 A1 | 11/2009 | Carr et al. | |
| 2010/0022330 A1 | 1/2010 | Rourke et al. | |
| 2010/0200333 A1 | 8/2010 | Maurice et al. | |
| 2013/0171864 A1 | 7/2013 | Farris-Gilbert et al. | |
| 2013/0205557 A1 | 8/2013 | MacArthur et al. | |
| 2014/0331464 A1 | 11/2014 | Jiang et al. | |
| 2015/0028565 A1 | 1/2015 | Bowe | |
| 2016/0129847 A1* | 5/2016 | Mehlen | B60D 1/58 |
| | | | 224/509 |
| 2017/0087946 A1 | 3/2017 | Fincher | |
| 2017/0348838 A1 | 12/2017 | Hancock | |
| 2018/0015797 A1 | 1/2018 | Hancock | |
| 2018/0029207 A1 | 2/2018 | Hieronymus | |
| 2018/0147715 A1 | 5/2018 | Promo et al. | |
| 2021/0129608 A1* | 5/2021 | Bowe | B60D 1/48 |
| 2022/0032140 A1 | 2/2022 | Regalado | |

FOREIGN PATENT DOCUMENTS

| | | |
|---|---|---|
| EM | 007877162-0001 | 5/2020 |
| JP | 4546949 B2 | 7/2010 |
| JP | 5220149 B2 | 3/2013 |
| WO | 2006138371 A2 | 12/2006 |

OTHER PUBLICATIONS

Amazon.com: Pin Wiz Trailer Hitch Clip, oldest review 2018, https://www.amazon.com/Pin-Wiz-Trailer-Hitch-Black/dp/B079QQ9PK5/ref-ref_cm_cr_arp_d_product_top?ie=UTF8, site visited Aug. 17, 2018 (Year: 2018; 13 pages.

Cotter hair pin Details—175-2106—USA—CLEAN, website 2018, site visited Aug. 17, 2018,https://usafix.usaclean.com/ . . . , m_adwords &gclid_CjOKCGjw5NnbBRDaARIsAJP-YR_UW77SZTGUF2JSm9PxkkOaDakw9H-ZPFomLCCZULNJTk-G3rR91UaAsZxEALw_wcB (Year:2018); 7 pages.

Durometer Shore Hardness Scale for Rubbers.

Hand Moldable Plastic Molding a Handle published on May 9, 2011 at https://www.youtube.com/watch?v=RGSKSDdWIKw (Year:2011).

Pin Wiz Trailer Hitch Clip and Hitch Pin.

Suregrip™ L-Handle Hitch Pin Lock; Found at https://www.resses-hitches.com/prodcuts/suregrip_tradeChrome, 3015-049 (Year:2019).

Thomas, Sabu Maria, Hanna J. Joy, Jithin Chan, Chin Han Pothen, Laly A.. (2014), Natural Rubber materials, vol. 2—Composites and Nanocomposites—15.4.2.1 Hardness Type Shore A. Royal Society of Chemistry.

Nordel EPDM Product Selection Guide; The Dow Chemical Company, Apr. 2014.

Buyers Hitch Pin, Johnsons surplus website 2023, site visited Apr. 25, 2023, https://www.johnsonssurplus.com/buyers-hitch-pin-w-cotter-1-x-6-1-4-66125.html.

* cited by examiner

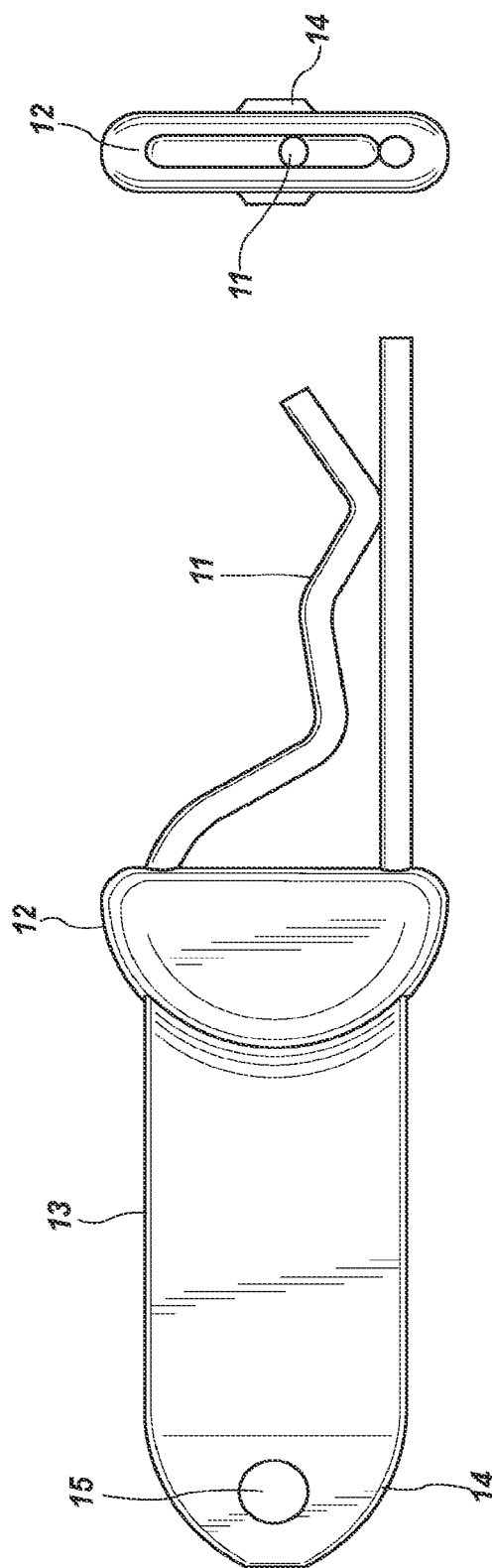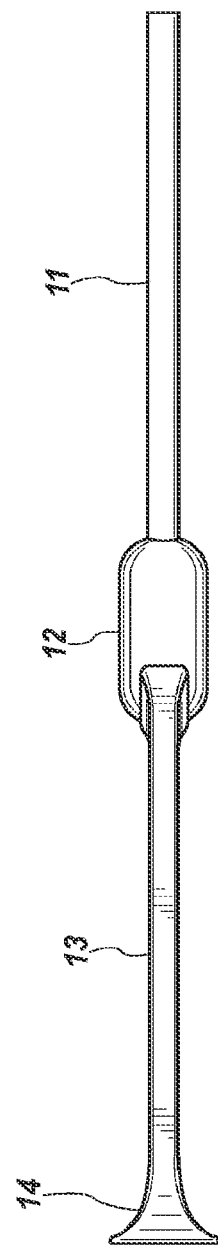
FIG. 6
FIG. 7
FIG. 8

APPARATUSES AND LOCKING ELEMENTS INCLUDING ASSIST DEVICES

CROSS-REFERENCE TO RELATED APPLICATIONS

This application is a continuation of U.S. patent application Ser. No. 17/132,808, filed Dec. 23, 2020, and titled "APPARATUSES AND LOCKING ELEMENTS INCLUDING ASSIST DEVICES," pending, which is a continuation of U.S. patent application Ser. No. 15/718,366, filed Sep. 28, 2017, and titled "PIN ASSIST DEVICES, HITCH PINS, AND HITCH PIN ASSEMBLIES," pending, which is a continuation-in-part of U.S. patent application Ser. No. 15/418,442, filed Jan. 27, 2017, and titled "COTTER PIN ASSIST DEVICE," abandoned, which claims the benefit of U.S. Provisional Patent Application Ser. No. 62/344,902, filed Jun. 2, 2016, the disclosure of each of which applications is hereby incorporated herein in their entirety by this reference.

FIELD

Embodiments disclosed herein relate generally to pin insertion and extraction devices and assemblies utilizing the pin insertion and extraction devices. More specifically, embodiments disclosed herein related to pin assist devices for use with one or more types of retaining pins configured to assist a user in inserting and removing a retaining pin associated with the pin assist device without the need of an external tool.

BACKGROUND

A cotter pin (also known as an R-pin, cotter pin, or hairpin cotter pin) is a fastener made of springy material, usually hardened metal wire. Cotter pins are commonly used to secure the ends of round shafts such as axles and clevis pins. Cotter pins may include a straight leg connected to a bent leg. The straight leg of the cotter pin is pushed through a hole at one end of a shaft until the middle, or belly, of the bent leg grips the side of the shaft away from the straight leg. The cotter pin is usually bent so that it remains in constant tension and will not come loose from the hole into which it has been inserted without the user applying some force to remove. The end of the bent leg most often is built to point away from the straight leg to facilitate insertion of the cotter pin.

Cotter pins are frequently used in connecting various components and can be located in recessed locations with limited access that hinder a user's ability to insert and extract the cotter pin. Some have attempted to solve the problem of inserting and extracting a cotter pin by designing tools that are separate from the cotter pin, such as cotter pin extracting pliers. In a typical scenario, a cotter pin is used to secure a ball mount hitch to a receiver tube on a vehicle. Once the hitch is inserted into the receiver tube, a hitch pin is inserted through holes located in both the hitch and receiver. A cotter pin is then inserted into a hole in the hitch pin to prevent the hitch pin from falling out. When dealing with this scenario, the last thing a user should have to worry about is locating a tool to help with the insertion and extraction of the cotter pin. In addition, such a tool is often useless in facilitating the insertion of a cotter pin.

Similarly, other retaining pins also encounter similar problems. For example, linchpins, trailer safety pins, snap pins, and other retaining members may require additional tools to assist in the insertion and extraction thereof. These pins all utilize mechanical force, such as a spring, to form a latch or stop to retain (e.g., lock) the retaining pin in place.

In addition to being located in difficult to reach areas, such retaining pins often rust and bind to the shaft or member that they are intended to retain in place. Rusting of the retaining pins increases a difficulty of withdrawing the retaining pin from the shaft and removing the shaft (e.g., a hitch pin) from, for example, a hitch receiver.

BRIEF SUMMARY

Embodiments disclosed herein include pin assist devices, hitch pins, and hitch pin assemblies including the hitch pins and pin assist devices. For example, in accordance with one embodiment, a pin assist device comprises an insertion end operably coupled to a retaining pin, an extraction end opposite the insertion end, the extraction end comprising a gripping element, and a middle portion between the insertion end and the extraction end, the middle portion having a thickness less than a thickness of each of the insertion end and the extraction end.

In additional embodiments, a hitch pin assembly comprises a hitch pin and a retaining pin. The hitch pin comprises an elongate portion comprising a retaining pin receiver on a distal end thereof, and a bent portion comprising a gripping element, the gripping element comprising at least one protrusion in a direction toward the distal end of the elongate portion. The retaining pin comprises a portion configured to engage the retaining pin receiver, a latching element configured to retain the retaining pin in the retaining pin receiver, and a pin assist device comprising a flexible material coupled to at least one of the retaining pin and the latching element.

In further embodiments, a hitch pin comprises a cylindrical elongate shaft having a proximal end and a distal end, a retaining pin receiver at the distal end of the cylindrical shaft, and a handle extending away from the proximate end of the cylindrical elongate shaft at an angle. The handle comprises a protrusion on a base of the handle, the protrusion protruding in a direction toward the distal end of the cylindrical elongate shaft, and a gripping element comprising a resilient material around at least a portion of the handle, the gripping element having a curved surface configured to receive a finger of a user.

BRIEF DESCRIPTION OF THE DRAWINGS

FIG. 6 is a side view of the pin assist device of FIG. 1;

FIG. 7 is a top view of the pin assist device of FIG. 1;

FIG. 8 is an end view of the pin assist device of FIG. 1;

DETAILED DESCRIPTION

Figure 1:
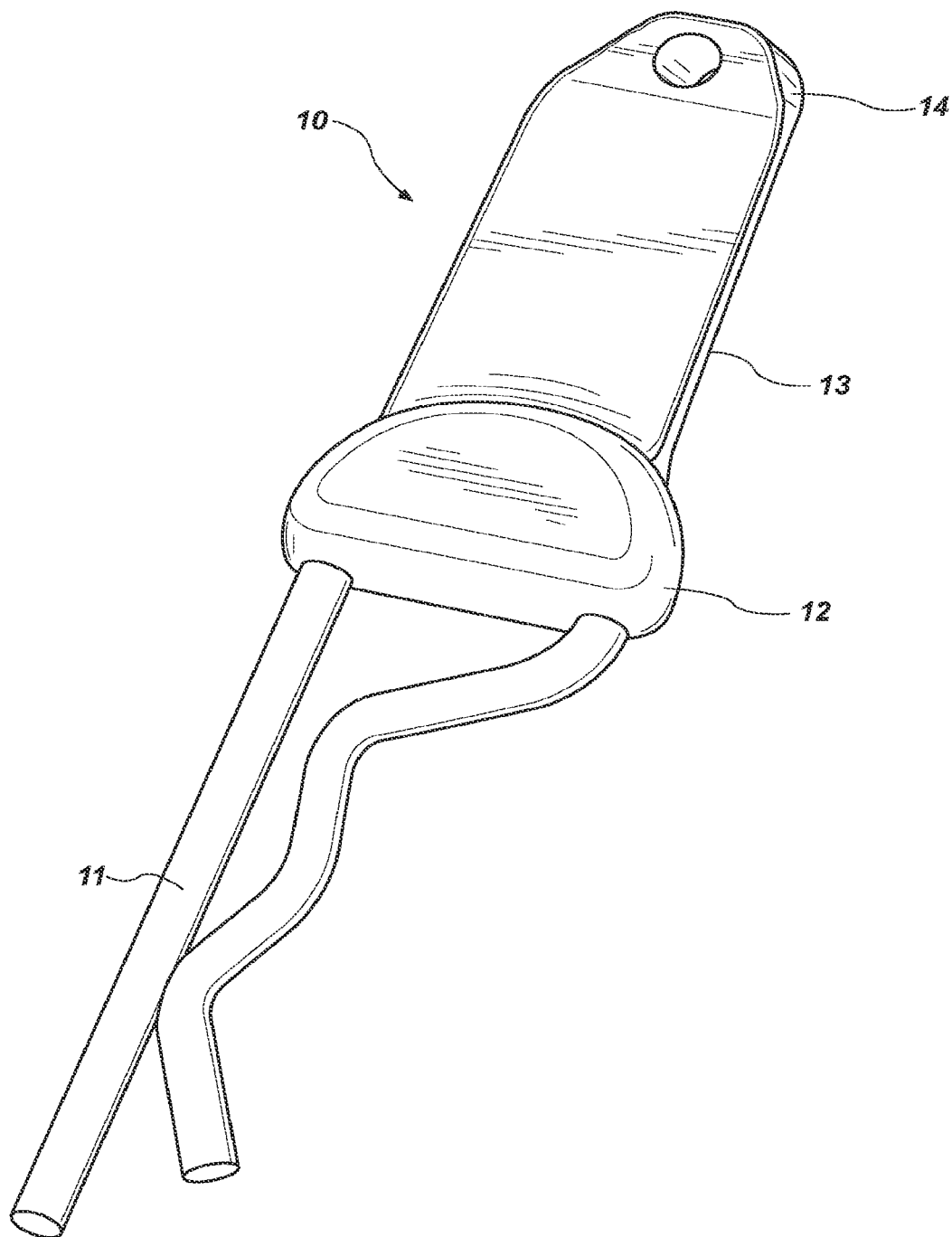
FIG. 1 is a perspective view of a pin assist device, in accordance with embodiments of the disclosure.

The illustrations presented herein are not meant to be actual views of any particular pin assist device, retaining pin including the pin assist device, hitch pin or component thereof, but are merely idealized representations employed to describe illustrative embodiments. The drawings are not necessarily to scale.

As used herein, the term "retaining member" means and includes a structure configured for retaining and/or locking another structure, such as, for example, a shaft, in place. By way of nonlimiting example, a retaining member may include a locking pin (e.g., a round lock pin, a square lock pin, etc.), a linchpin, a cotter pin, a clip, a plunger pin, a detent pin, a clevis pin, another type of retaining member, another pin for retaining, for example, a hitch pin, in place. As used herein, the terms "retaining member" and "retaining pin" are used interchangeably.

As used herein, the term "retaining member assist device" means and includes a device coupled to or configured to be coupled to a retaining member. A retaining member assist device may be configured to facilitate insertion and extraction of a retaining member associated with the retaining member assist device into or from another structure (e.g., a shaft). As used herein, the terms "retaining pin assist device," "retaining member assist device," and "pin assist device" are used interchangeably.

Embodiments disclosed herein provide a pin assist device that is attached to a retaining pin and provides a means for a user to effectively grip the retaining pin to either insert or extract it without having to locate and use a separate tool.

Some embodiments disclosed herein are directed to a retaining pin that includes an insertion portion for grasping the retaining pin to allow for easy insertion thereof into a hitch pin without using a separate tool.

Additional embodiments disclosed herein are directed to a device that includes an extraction portion that allows for easy removal of the retaining pin from a hitch without using a separate tool.

An embodiment of a device that can be easily grasped by the user to insert or extract the retaining pin is described. An advantage of the device is that the insertion function and extraction function can be accomplished by a single device that is attached to the retaining pin.

The embodiments described herein may be embodied in the form illustrated in the accompanying drawings. The drawings, however, are illustrative only. Variations are contemplated as being part of the invention, limited only by the scope of the claims.

The embodiments disclosed herein relate generally to pin assist devices for use with retaining pins such as cotter pins, linchpins, locking pins, retaining pins, plunger pins, detent pins, clevis pins, and other locking or retaining pins. Embodiments of the disclosure further relate to retaining pins, such as cotter pins, linchpins, locking pins, plunger pins, detent pins, and clevis pins including the pin assist devices. Embodiments of the pin assist device may enable a user to more easily manipulate, grip, insert and remove the associated retaining pin from another member, such as a hitch pin or a trailer hitch (e.g., a draw bar), a hitch receiver, etc. The pin assist device may improve a user's ability to manipulate the associated pin while wearing gloves.

Some embodiments relate to hitch pins including a gripping element, which hitch pins may be used with the pin assist device and associated retaining pin. Hitch pins with the gripping element may facilitate easier insertion and extraction of the hitch pin compared to conventional hitch pins.

FIG. 1 illustrates a pin assist device 10 (e.g., a cotter pin 11) attached to a pin assist device 10. In a preferred embodiment, the pin assist device 10 is made out of a flexible material (e.g., resilient material) and is fixedly attached to the cotter pin 11. The pin assist device 10 includes an insertion end 12 (e.g., a coupling end), an extraction end 14 (e.g., a gripping end), and a middle section 13 connecting the insertion end 12 to the extraction end 14. The end of the cotter pin 11 is encased in the flexible material, which material is thicker around the cotter pin 11 and the insertion end 12, tapers off in the middle section 13 and is thicker again at the extraction end 14. In other words, the pin assist device 10 has a greater thickness at the insertion end 12 and the extraction end 14 and a lesser thickness at the middle section 13.

In some embodiments, the thickness of the extraction end 14 may be between about 2 mm and about 10 mm, such as between about 2 mm and about 4 mm, between about 4 mm and about 6 mm, between about 6 mm and about 8 mm, or between about 6 mm and about 8 mm. However, the disclosure is not limited to a particular thickness of the extraction end 14. In some embodiments, the thickness of the extraction end 14 is between about 7 mm and about 8 mm.

The thickness of the middle section 13 may be between about 2 mm and about 6 mm, such as between about 2 mm and about 3 mm, between about 3 mm and about 4 mm, between about 4 mm and about 5 mm, or between about 5 mm and about 6 mm. In some embodiments, the thickness of the middle section 13 is about 3 mm. In some embodiments, the thickness of the middle section 13 may be equal to about half a thickness of the extraction end 14.

The thickness of the insertion end 12 may be between about 2 mm and about 10 mm, such as between about 2 mm and about 4 mm, between about 4 mm and about 6 mm, between about 6 mm and about 8 mm, or between about 6 mm and about 8 mm. However, the disclosure is not limited to a particular thickness of the extraction end 14. In some embodiments, the thickness of the insertion end 12 is between about 7 mm and about 8 mm. In some embodiments, the thickness of the insertion end 12 is equal to about the thickness of the extraction end 14.

The difference in thickness between the insertion end 12 and middle section 13 may provide a grip that a user may hold, for example, when inserting the cotter pin 11 into another structure (e.g., into a hitch pin). The difference in thickness between the insertion end 12 and the middle section 13 may also provide stability to the cotter pin 11 when it is inserted into the another structure. While it may be useful to vary the thickness between the insertion end 12 and middle section 13 of the pin assist device 10 in some embodiments, the pin assist device 10 can also be made of a uniform thickness.

The pin assist device 10 may include one or more elements to facilitate gripping thereof by a user. In some embodiments, a gripping portion of the pin assist device 10 may be defined by the middle section 13 and the extraction end 14. By way of nonlimiting example, the pin assist device 10 may include a textured surface including one or more bumps, ridges, grooves, holes, protrusions, etc. In some embodiments, the extraction end 14 and the middle section 13 may include the gripping elements. In some embodiments, the material of the pin assist device 10 may comprise a material exhibiting a high surface roughness. In some embodiments, the material of the pin assist device comprises a high friction material, such as a material having a coefficient of static friction between about 0.7 and about 1.3, such as between about 0.7 and about 0.9, between about 0.9 and about 1.1, or between about 1.1 and about 1.3. In some embodiments, the coefficient of static friction may be between about 1.1 and about 1.2.

The durometer of the pin assist device 10 may be varied to increase or decrease the tension (e.g., the rigidity) of the cotter pin 11. For instance a material with a higher durometer may cause the tension in the cotter pin 11 to be stronger (e.g., higher), making the cotter pin 11 more difficult to insert or withdraw. A material with a lower durometer may cause less tension in the cotter pin 11, making it easier to insert or withdraw. Depending on how the cotter pin 11 is used, the durometer of the material may be varied to best meet the user's desired purpose.

As used herein, a durometer of a material means and includes a type A durometer of the material, as measured using, for example, the ASTM D2240 standard test method for measuring durometer.

In some embodiments, the durometer of the pin assist device 10 material may be between about 30 and about 100, such as between about 30 and about 40, between about 40 and about 50, between about 50 and about 60, between about 50 and about 60, between about 60 and about 70, between about 70 and about 80, between about 80 and about 90, or between about 90 and about 100. In some embodiments the durometer of the pin assist device 10 material may be between about 75 and about 85. In some embodiments, the durometer may be about 80. The pin assist device 10 may comprise rubber, silicon, nylon, rope, leather, and combination thereof.

In use and operation, when it is desired to remove the cotter pin 11, the user grasps the extraction end 14 of the pin assist device 10, which has a grip that results from the flexible material on the extraction end 14 being thicker than the middle section 13 of the pin assist device 10. Instead of reaching for a separate tool like a pair of pliers or a screwdriver, the user simply grabs the raised extraction end 14 and pulls to remove the cotter pin 11. Often in circumstances when a cotter pin is being utilized, the user will be wearing gloves. Because of the tapered ends (i.e., the insertion end 12 and the extraction end 14 or, a transition from the middle section 13 to each of the insertion end 12 and the extraction end 14) of the pin assist device 10, a user can easily insert or extract a cotter pin 11 with or without gloves. The user can also extract the cotter pin 11 from various angles because of the flexibility of the pin assist device 10. This is particularly useful when the desired pin assist device 10 to be removed is in a hard to reach location. The user can simply grasp the extraction end 14 of the pin assist device 10 and pull to extract the cotter pin 11 without the need to pull in a direction that is parallel to the pin (e.g., parallel to the legs of the cotter pin 11).

Figure 2:
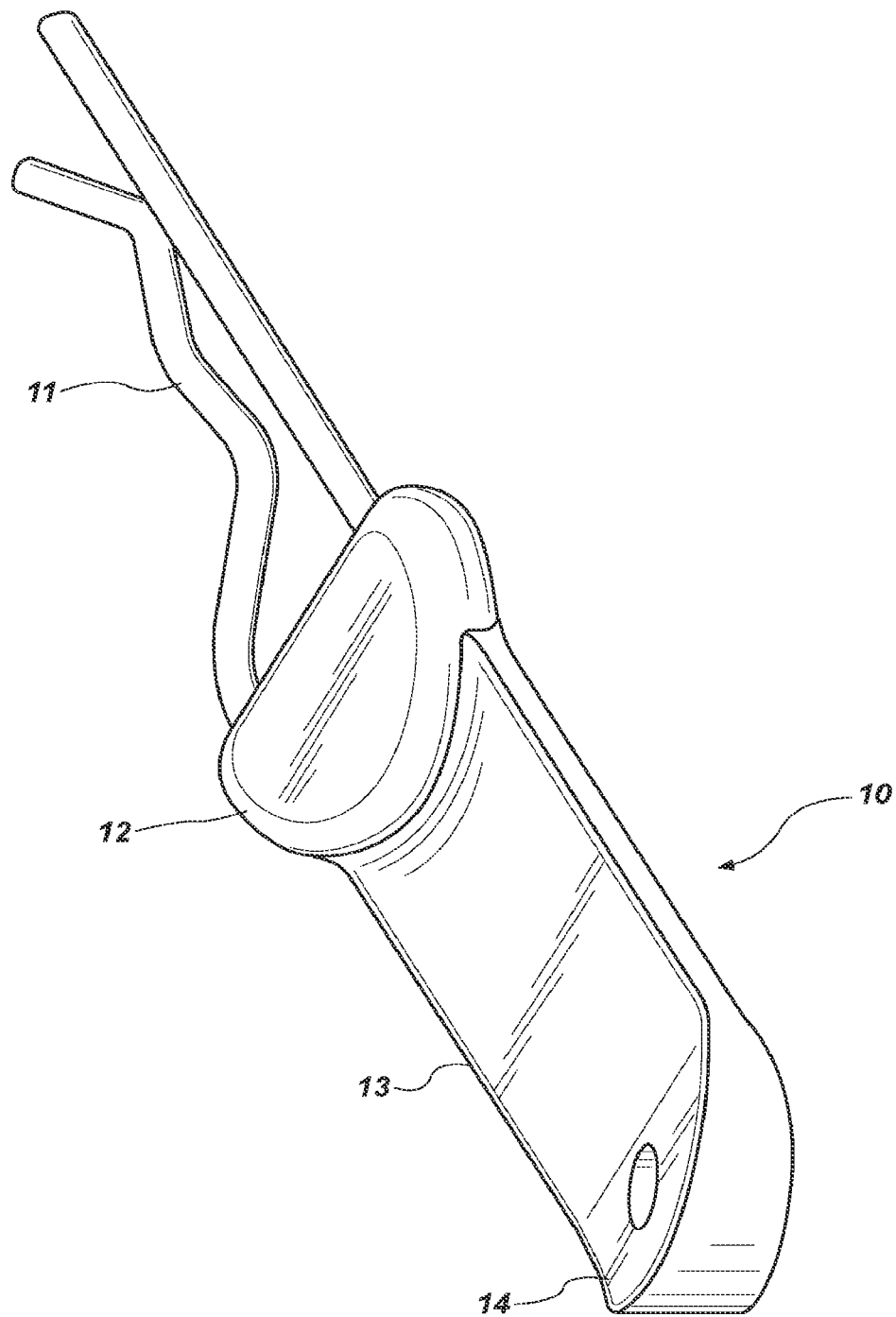
FIG. 2 is another perspective view of the pin assist device of FIG. 1.
Figure 4:
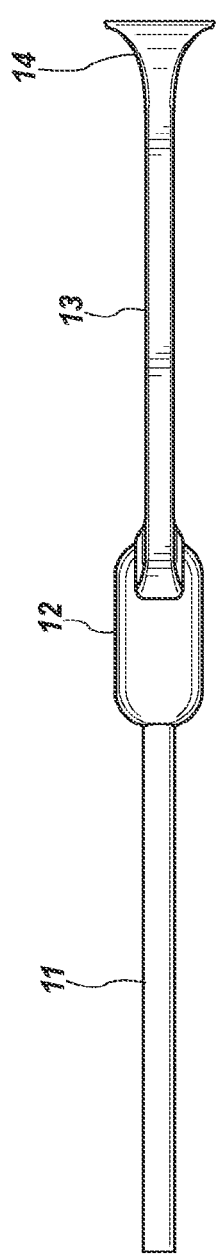
FIG. 4 is a bottom view of the pin assist device of FIG. 1.

In FIG. 2, FIG. 4, and FIG. 7, the difference in thickness between the insertion end 12, middle section 13 and extraction end 14 is shown. While the pin assist device 10 is illustrated as being fixedly attached to a cotter pin 11, it is understood that the pin assist device 10 could also be removably attached (e.g., coupled, locked, otherwise secured, etc.) to a cotter pin 11. In some embodiments, the pin assist device 10 comprises a removable coupling, such as at the insertion end 12 for removably attaching the pin assist device 10 to the cotter pin 11. The removable coupling may include, by way of nonlimiting example, a U-bolt, a threaded portion, a snap connector, hook and loop fasteners (e.g., VELCRO®), or other means for coupling the pin assist device 10 to the cotter pin 11.

Although FIG. 1 through FIG. 9 show the pin assist device 10 and cotter pin 11 as comprising a single molded piece, in other embodiments, the pin assist device 10 may include two or more components that are secured or otherwise coupled to each other, at least one of which may be coupled to the cotter pin 11.

Figure 3:
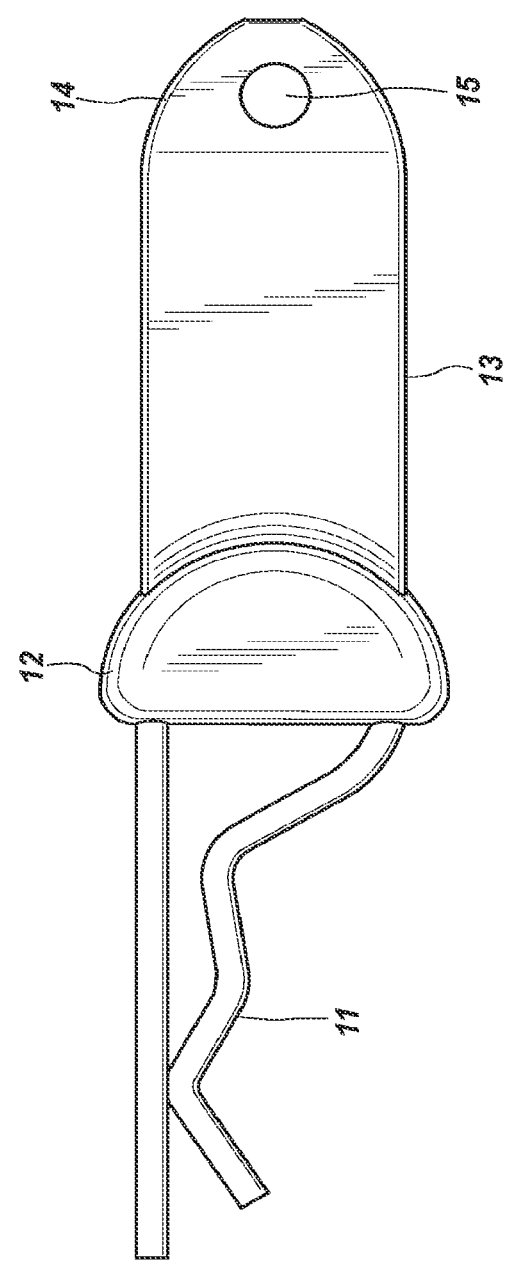
FIG. 3 is a side view of the pin assist device of FIG. 1.

FIG. 3 and FIG. 6 show opposite sides of the pin assist device 10 and illustrate that the insertion end 12 is created when the desired flexible material is formed around cotter pin 11. In other words, in some embodiments, the pin assist device 10 (such as the insertion end 12 thereof) may substantially surround an end of the cotter pin 11 and couple the pin assist device 10 to the cotter pin 11. In some embodiments, a hole 15 may be defined in the extraction end 14 of the device to allow for easy storage of the pin assist device.

Figure 5:
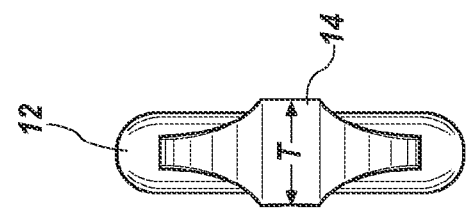
FIG. 5 is an end view of the pin assist device of FIG. 1.

FIG. 5 shows the thickness T of extraction end 14 of the pin assist device 10 in relation to middle section 13 and insertion end 12. The extraction end 14 can be easily grasped to assist in the extraction of a cotter pin. In some embodiments, the thickness of the extraction end 14 is greater than a thickness of the insertion end 12.

FIG. 8 is an end perspective that shows cotter pin 11 in relation to the insertion end 12. In some embodiments, the thickness of insertion end 12 may enable a user to get a better grip of the cotter pin 11 to allow for easy insertion of the cotter pin 11.

Figure 9:
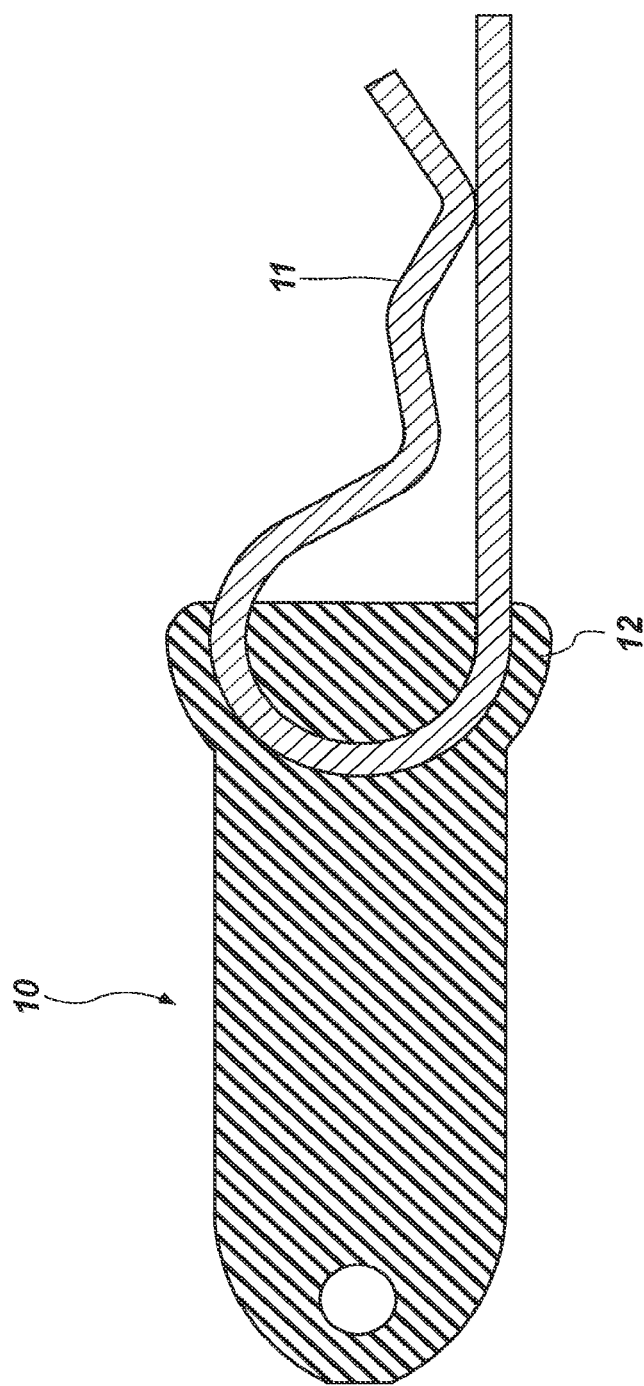
FIG. 9 is a cross-sectional side view showing the interior of the pin assist device of FIG. 1.

FIG. 9 is a cross-sectional side view showing a cutaway of the cotter pin assist device 10 and the cotter pin 11 and the location of the cotter pin 11 embedded in the flexible material on the insertion end 12 of the pin assist device 10. Although FIG. 9 illustrates the pin assist device 10 coupled to a cotter pin 11, the disclosure is not so limited. In other embodiments, a pin assist device may be coupled to another type of pin, such as a lynch pin (e.g., a linchpin, ring catch pin, ring latch pin), a locking pin (e.g., a safety pin, a snapper pin, a wire snap pin, a coupler locking pin, a square loop wire lock pin, a round loop wire lock pin, a shaft lock pin, etc.), a retaining pin, a hitch pin, a detent pin, a plunger pin, a clevis pin, etc.

Figure 12:
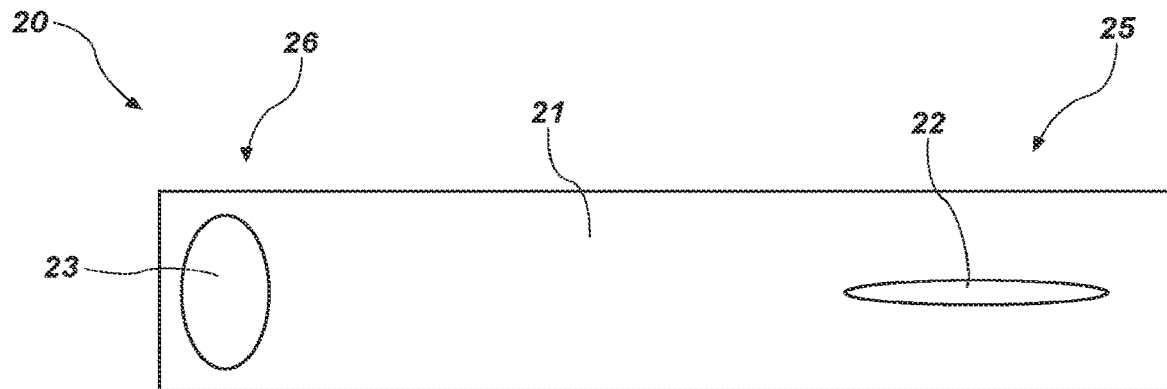
FIG. 12 is a top view of the pin assist device of FIG. 11.
Figure 11:
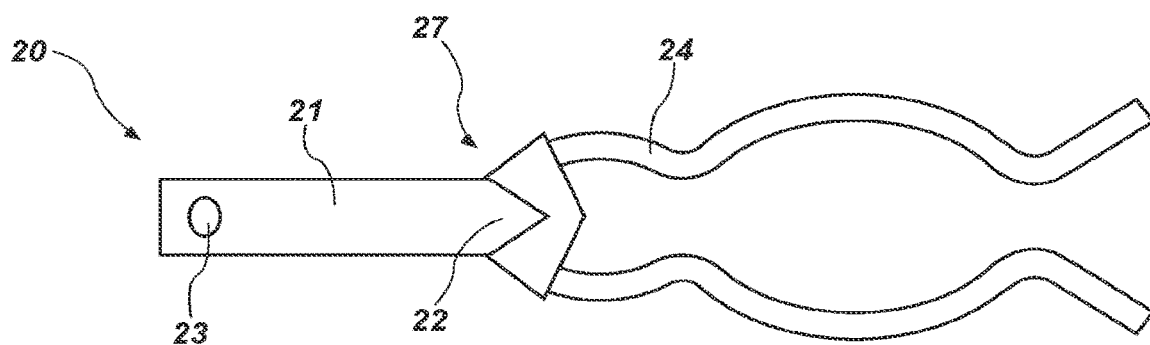
FIG. 11 is a top view of a pin assist device, in accordance with embodiments of the disclosure.

Referring to FIG. 11 and FIG. 12, a pin assist device 20 is shown, in accordance with embodiments of the disclosure. FIG. 11 is a top view of the pin assist device 20 and FIG. 12 is a top view of the pin assist device 20 after the pin assist device 20 is coupled to a pin 24. The pin 24 may comprise a retaining pin, such as cotter pins, linchpins, locking pins, retaining pins, plunger pins, detent pins, clevis pins, and other locking or retaining pin.

In some embodiments, the pin assist device 20 may comprise a flexible strap 21. The flexible strap 21 may include an opening 22 on a first end 25 of the flexible strap 21 and a gripping element 23 on an opposing, second end 26 of the strap. The opening 22 may comprise an elongated opening 22 extending longitudinally along a length of the flexible strap 21. The flexible strap 21 may be removably coupled to the pin 24, by wrapping (e.g., enveloping, surrounding, sandwiching) around a portion of the pin 24 and inserting (e.g., threading) the second end 26 of the flexible strap 21 with the gripping element 23 through the opening 22 to form a wrapped portion 27, such as a lanyard hitch (e.g., ring hitch, larks head, cow hitch) knot, etc. In other words, in some embodiments, the flexible strap 21 may be coupled to the pin 24 with a lanyard hitch.

In some embodiments, the flexible strap 21 may include one or more clasps, buttons, snaps, hooks, rings, buckles, knots, etc., located and positioned to couple with a respective clasp, button, snap, hook, ring, buckle, etc. after wrapping the flexible strap 21 around the pin 24. Once the flexible strap 21 is coupled to the pin 24 the user may grasp the gripping element 23 to pull the pin 24 free (i.e., such as from a hitch pin). In other words, the gripping element 23 may be used to remove the pin 24 from a corresponding shaft (e.g., a hitch pin). In some embodiments, a wrapped portion 27 of the flexible strap 21 may provide a thicker area upon which the user may push to insert the pin 24. Accordingly, in some embodiments, a pin assist device 20 may be removable coupled to a pin 24.

Figure 13:
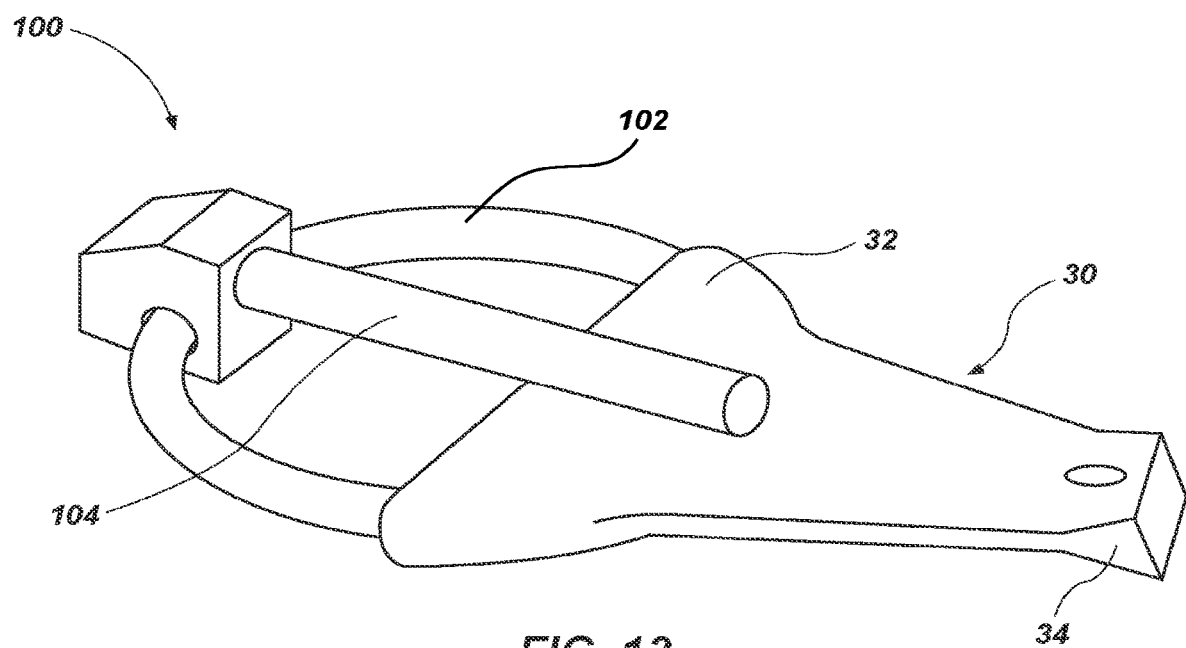
FIG. 13 is a perspective view of another pin assist device, in accordance with embodiments of the disclosure.

Referring to FIG. 13, a pin assist device 30 may be coupled to a lynch pin 100. A lynch pin 100 may comprise a locking element 102 (e.g., a ring, a pin latching accessory, a latching element, etc.) and a pin 104. The locking element 102 may be biased toward the pin 104 such that the locking element 102 maintains a clamping force against the pin 104. The pin assist device 30 may be coupled to the locking element 102 of the lynch pin 100. The locking element 102 may be attached (e.g., coupled) to an insertion end 32 of the pin assist device 20. A user may grip the pin assist device 30 at an extraction end 34 thereof and pull the pin assist device 30 to overcome the clamping force of the locking element 102 against the pin 104.

The pin assist device 30 may comprise a flexible (e.g., resilient) material, such as rubber, silicon, nylon, rope, leather, etc. In some embodiments, the pin assist device 30 is secured to the lynch pin 100, such as molded thereto. In other embodiments, the pin assist device 30 is removably attached to the lynch pin 100, such as with a buckle, a strap, hook and loop fasteners, one or more buttons, one or more snaps, etc. The insertion end 32 of the pin assist device 30 may encapsulate an end of the lynch pin 100. As described above with reference to the pin assist device 10 (FIG. 1), a thickness of the pin assist device 30 may vary across a length thereof. For example, the pin assist device 30 may have a greater thickness at the extraction end 34 and the insertion end 32 than at a middle portion thereof, which thicknesses may be the same as the thickness of the extraction end 14 and the thickness of the insertion end 12 of the pin assist device 10 described above with reference to FIG. 1 through FIG. 9.

Figure 14:
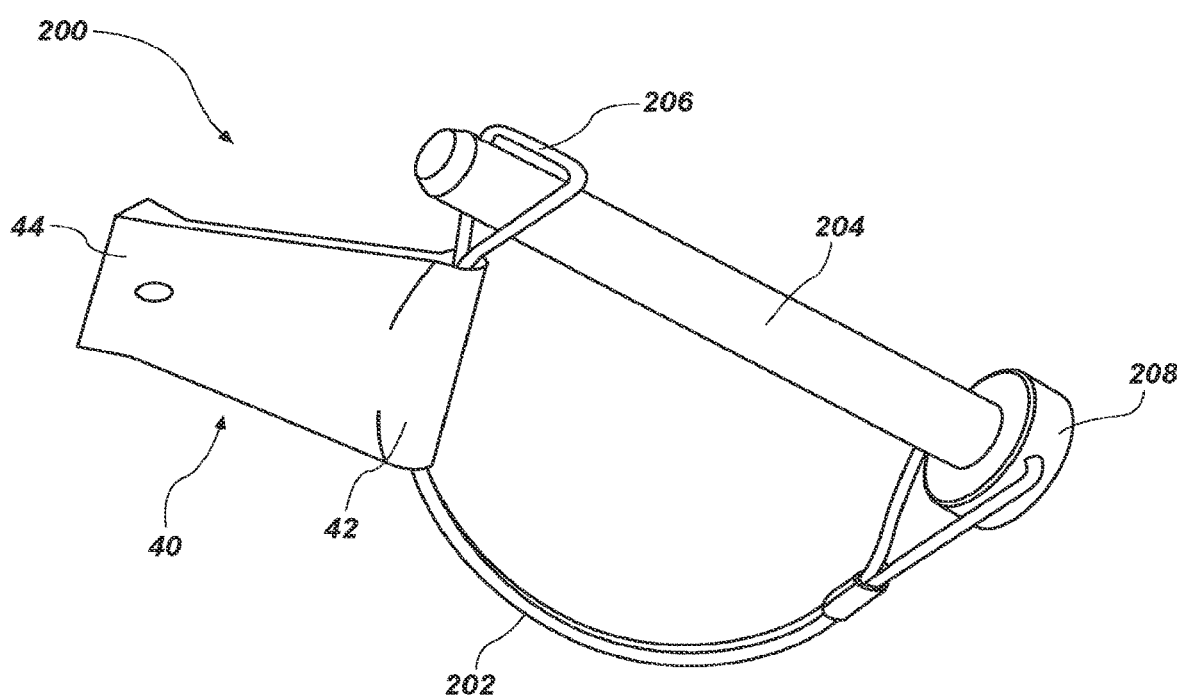
FIG. 14 is a perspective view of a pin assist device, in accordance with embodiments of the disclosure.

FIG. 14, is a pin assist device 40, in accordance with embodiments of the disclosure. The pin assist device 40 may be coupled to a locking pin (also referred to as a lock pin) 200. Although FIG. 14 illustrates a round loop wire lock pin 200, the disclosure is not so limited. In other embodiments, the locking pin 200 may comprise a safety pin, a snapper pin (e.g., a wire snap pin), coupler locking pin, a shaft lock pin, a loop wire lock pin (e.g., a square loop wire lock pin, etc.), another locking pin, etc. The pin assist device 40 may be coupled to any locking pins known in the art in a similar manner. The round loop wire lock pin 200 may comprise a wire loop 202 (e.g., pin latching accessory), a pin 204, a locking element 206 (e.g., mechanism pin catch, latching element), and a pin head 208 with the wire loop 202 rotatably connected to the pin head 208. When in a locked position, the pin 204 may be inserted into the locking element 206 of the wire loop 202. To release the round loop wire lock pin 200 from the locked position the pin 204 may be removed from the locking element 206, thereby allowing the wire loop 202 to rotate in a direction away from the pin 204. The pin assist device 40 may be coupled to the wire loop 202 at an insertion end 42 thereof. The user may grip the pin assist device 40 at an extraction end 44 thereof and pull to deflect the wire loop 202, removing the pin 204 from the locking element 206. The user may also grip the extraction end 44 and pull to deflect the wire loop 202 to insert the pin 204 into the locking element 206. In some embodiments, the pin assist device 40 may be rotatably coupled to the wire loop 202. In other words, in some such embodiments, the pin assist device 40 may be configured to rotate around the wire loop 202. Although FIG. 14 illustrates the pin assist device 40 coupled to the wire loop 202, the disclosure is not so limited. In other embodiments, the pin assist device 40 may be coupled to the locking element 206.

The pin assist device 40 may comprise a flexible (e.g., resilient) material, such as rubber, silicon, nylon, rope, leather, etc. In some embodiments, the pin assist device 40 is secured to the locking pin 200, such as molded thereto. In other embodiments, the pin assist device 40 is removably attached to the locking pin 200, such as with a buckle, a strap, hook and loop fasteners, one or more buttons, one or more snaps, etc.

As described above with reference to the pin assist device 10, a thickness of the pin assist device 40 may vary across a length thereof. For example, the pin assist device 40 may have a greater thickness at the extraction end 44 and the insertion end 42 than at a middle portion thereof, which thicknesses may be the same as the thickness of the extraction end 14 and the thickness of the insertion end 12 of the pin assist device 10 described above with reference to FIG. 1 through FIG. 9.

Figure 15:
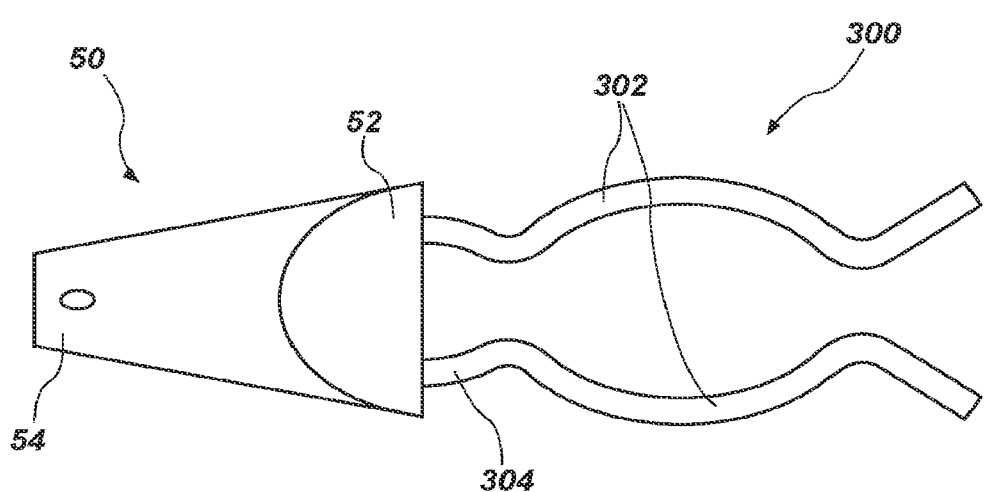
FIG. 15 is a top view of a pin assist device, in accordance with embodiments of the disclosure.

FIG. 15 is a top view of a pin assist device 50, in accordance with some embodiments of the disclosure. The pin assist device 50 may be coupled to an external hitch pin 300. The external hitch pin 300 may be configured similar to a cotter pin; however, the external hitch pin 300 may not have a straight section. For example, the external hitch pin 300 may include a curved latching section 302 configured to latch on the outside of an element. The external hitch pin 300 may further include a head section 304 connected to the curved latching section 302. The pin assist device 50 may be coupled to the external hitch pin 300 at the head section 304 of the external hitch pin 300. The user may apply a force to an insertion end 52 of the pin assist device 50 when inserting the external hitch pin 300 into, for example, a hitch pin or other retaining member. The user also may grip an extraction end 54 and pull to remove the external hitch pin 300. As described above with reference to the pin assist device 50, a thickness of the pin assist device 50 may vary across a length thereof. For example, the pin assist device 50 may have a greater thickness at the extraction end 54 and the insertion end 52 than at a middle portion thereof, which thicknesses may be the same as the thickness of the extraction end 14 and the thickness of the insertion end 12 of the pin assist device 10 described above with reference to FIG. 1 through FIG. 9.

The pin assist device 50 may comprise a flexible (e.g., resilient) material, such as rubber, silicon, nylon, rope, leather, etc. In some embodiments, the pin assist device 50 is secured to the external hitch pin 300, such as molded thereto. In other embodiments, the pin assist device 50 is removably attached to the external hitch pin 300, such as with a buckle, a strap, hook and loop fasteners, one or more buttons, one or more snaps, etc.

Figure 10:
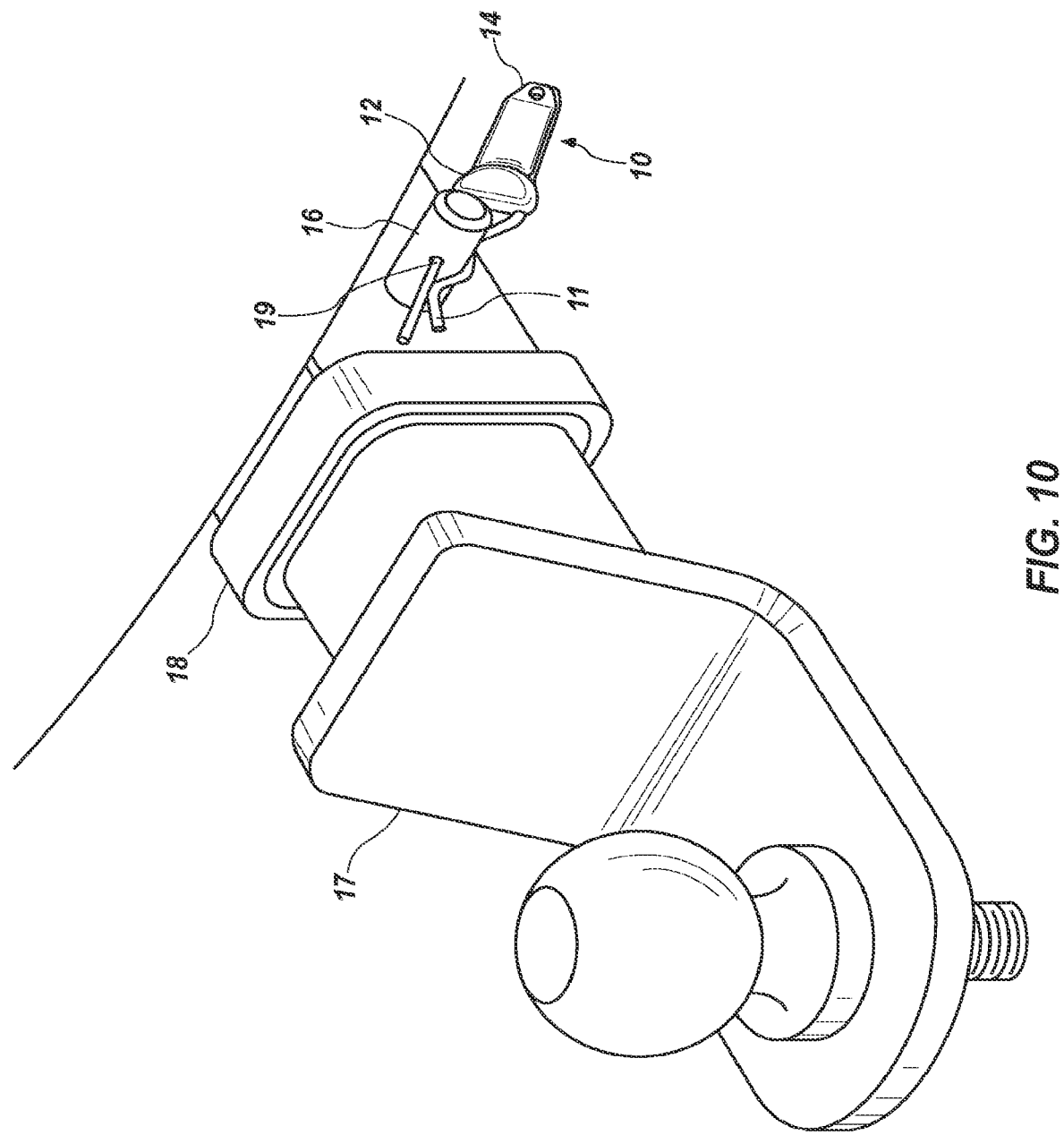
FIG. 10 is a perspective view showing an embodiment of the disclosure inserted into a hitch pin.

FIG. 10 shows a cotter pin 11 attached to pin assist device 10 inserted into a hitch pin 16. The hitch pin 16 is used to secure a hitch 17 to a receiver 18. The pin assist device 10 may be inserted by a user by gripping the pin assist device 10 at the insertion end 12 and pushing the cotter pin 11 through a hole 19 in the hitch pin 16. In order to remove the hitch pin 16, the user may grip the pin assist device 10 at the extraction end 14, extract cotter pin 11 and then remove the hitch pin 16. Once the hitch pin 16 is removed, the user can remove the hitch 17 from receiver 18. Although FIG. 10 illustrates the pin assist device 10, it is understood that the pin assist device may include any of the pin assist devices 10, 20, 30, 40, 50 described above with reference to FIG. 1 through FIG. 9 and FIG. 11 through FIG. 15.

Figure 16:
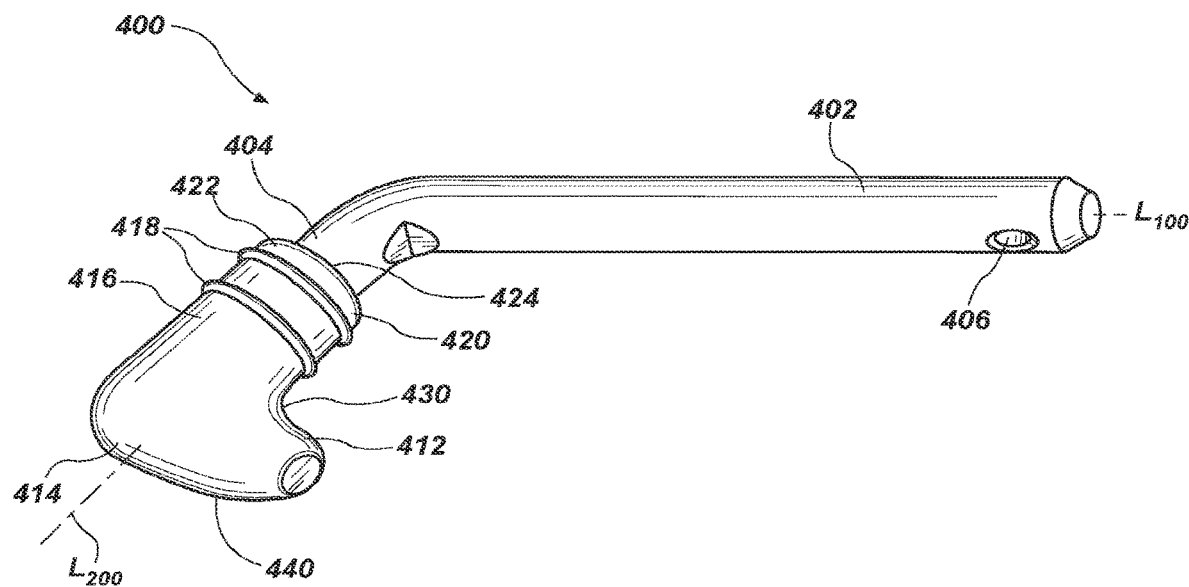
FIG. 16 is a side view of a hitch pin including a gripping element, in accordance with embodiments of the disclosure.

FIG. 16 is a perspective view of a hitch pin 400, in accordance with embodiments of the disclosure. The hitch pin 400 may be formed of metal materials such as, stainless steel, hardened and unhardened steel, brass, etc. The hitch pin 400 may include an elongate portion 402 (e.g., an elongate shaft) and a handle 404. In some embodiments, the elongate portion 402 may be cylindrical in shape and may extend along a longitudinal axis $L_{100}$ thereof.

In use and operation the elongate portion 402 may be inserted through the receiver 18 (FIG. 10) and hitch 17 (FIG. 10) to secure the hitch 17 to the receiver 18. The user may grip the handle 404 when inserting and/or removing the hitch pin 400. The handle 404 may include a gripping element 416, including a curved surface 430. The curved surface 430 may have a radius of curvature between about 1.0 cm and about 3.0 cm, such as between about 1.0 cm and about 1.5 cm, between about 1.5 cm and about 2.0 cm, between about 2.0 cm and about 2.5 cm, or between about 2.5 cm and about 3.0 cm. In use and operation, a user may grasp the handle 404 and wrap a finger (e.g., an index finger) around the curved surface 430. A proximal end 440 of the hitch pin 400 may include an arcuate surface shaped and configured to be received in a palm of a user during insertion and extraction of the hitch pin 400.

In some embodiments, the elongate portion 402 may include a retaining pin receiver 406 positioned on the distal end of the elongate portion 402. The retaining pin receiver 406 may define a passageway (e.g., bore, hole, or opening) through the elongate portion 402 in a direction perpendicular to the longitudinal axis $L_{100}$ of the elongate portion 402. The retaining pin receiver 406 may be configured to receive a retaining pin, such as one of the retaining pins described above with reference to FIG. 1 through FIG. 9 and FIG. 10 through FIG. 15 to secure the hitch pin 400 within the hitch 17 (FIG. 10) and receiver 18 (FIG. 10).

Figure 17:
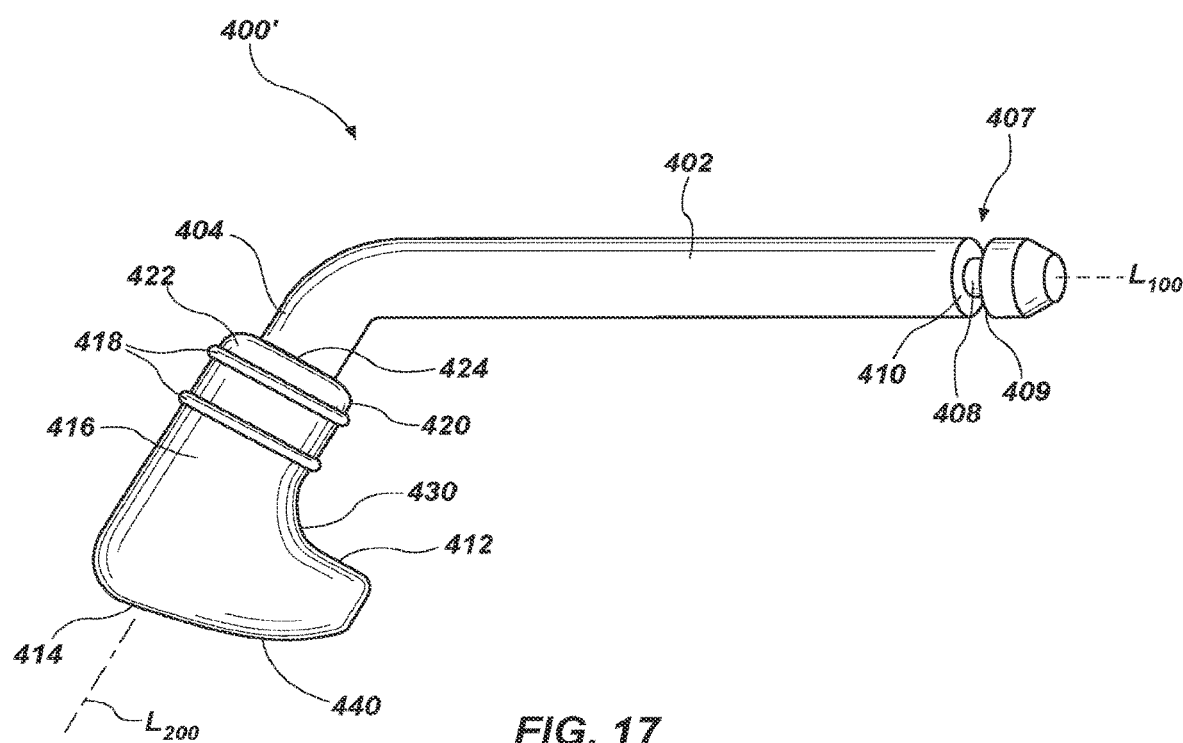
FIG. 17 is a perspective view of a hitch pin with a gripping element, in accordance with embodiments of the disclosure.

FIG. 17 illustrates a hitch pin 400' including a retaining pin receiver 407, in accordance with other embodiments of the disclosure. Some embodiments may utilize an annular groove at the distal end of the elongate portion 402 about (e.g., around) a longitudinal axis $L_{100}$ of the retaining pin receiver 407. The annular groove may include a smaller diameter portion 408 (e.g., a neck) between a proximal shoulder 410 and a distal shoulder 409. A retaining pin (e.g., cotter pin, locking pin, reverse hitch pin, lynch pin, indent pin, plunger pin, clevis pin, etc.), such as one of the retaining pins described above with reference to FIG. 1 through FIG. 9 and FIG. 10 through FIG. 15 may clamp over the smaller diameter portion 408 for locking the hitch pin 400 in place.

Referring to FIGS. 16 and 17, the handle 404 may extend at an angle away from the longitudinal axis $L_{100}$ of the elongate portion 402. The handle 404 may include at least one protrusion 412 on a base 414 thereof. The protrusion 412 may extend toward the distal end of the elongate portion 402. In some embodiments, the protrusion 412 extends toward the distal end of the elongate portion 402 in a direction parallel to the longitudinal axis $L_{100}$ of the elongate portion 402. In some embodiments, the protrusion 412 extends at an angle between about 60° and about 120° relative to an axis $L_{200}$ of the handle, such as at an angle between about 60° and about 75°, between about 75° and about 90°, between about 90° and about 105°, or between about 105° and about 120°. In some embodiments, the protrusion 412 extends at an angle of about 90° relative to the axis $L_{200}$.

The protrusion 412 may be positioned and located such that in use and operation, at least one of finger of a user's hand may rest thereon when handling (e.g., inserting, extracting) the hitch pin 400, 400'. As described above, in some embodiments, the arcuate surface may be configured to be received in a palm of a user's hand. In some embodiments the protrusion 412 may be integrally formed with the handle 404. In other embodiments, the protrusion 412 may be formed individually and attached to the handle 404. The protrusion 412, may be 404 attached to the handle 404 by any suitable method. By way of nonlimiting example, the protrusion 412 may be welded, brazed, threaded, interference fit, molded, lashed, shrink fitted, attached with one or more adhesives, etc., to the handle 404.

In some embodiments, the handle 404 may include a gripping element 416 comprising a resilient material, a flexible material, or a material that is both resilient and flexible. The gripping element 416 may include a front portion 420 and a back portion 422, located further from the distal end of the elongate portion 402 than the front portion 420. The front portion 420 may be connected to the back portion 422 with side portions 424. Accordingly, in some embodiments, the gripping element 416 may substantially surround an entire circumference of the handle 404. The gripping element 416 may have a durometer (e.g., a type A durometer) between about 40 and about 90. In some embodiments, the durometer of the gripping element 416 may be between about 75 and about 85. The gripping element 416 may comprise rubber, foam, silicone, nylon, leather, another flexible material, and combinations thereof.

The gripping element 416 may have a thickness between about 1 mm and about 10 mm, such as between about 1 mm and about 2 mm, between about 2 mm and about 4 mm, between about 4 mm and about 6 mm, between about 6 mm and about 8 mm, or between about 8 mm and about 10 mm. In some embodiments, the thickness of the gripping element 416 may vary along a circumference thereof. In some such embodiments, the front portion 420 and the back portion 422 may have a thickness greater than a thickness of the side portions 424. In other embodiments the side portions 424 may be thicker than the front portion 420 and back 422 portion. In yet other embodiments, the thickness may be different in each of the front portion 420, the back portion 422, and the side portions 424. In other embodiments, the thickness of the gripping element 416 may be substantially uniform around the circumference thereof.

In some embodiments, the gripping element 416 may be formed around at least portion of the handle 404. In some embodiments the gripping element 416 may be formed around the base 414 of the handle 404 and a top portion of the handle 404 may be exposed. In other embodiments, the gripping element 416 may cover substantially all surfaces of the entire handle 404 (e.g., substantially all surfaces of the bend portion of the hitch pin 400, 400').

The gripping element 416 may include at least one ridge 418. The at least one ridge 418 may protrude annularly about (e.g., around) a longitudinal axis $L_{200}$ of the handle 404. The at least one ridge 418 may comprise a plurality of ridges spaced along the length of the handle 404. In some embodiments, the gripping element 416 includes two ridges extending around the handle 404.

The description of the invention above should not be interpreted as limiting the invention to the disclosed embodiment because those who are skilled in the art to which the invention relates will be able to devise other equivalent forms thereof within the scope of the invention. Variations and changes, which are obvious to one skilled in the art, are intended to be within the scope and nature of the present invention.

What is claimed is:

1. A retaining member, comprising:
   a pin having a proximal end and a distal end;
   a pin latching accessory having a first end and a second end, the first end rotatably secured to the proximal end of the pin;
   an assist device extending from the pin latching accessory between the first end and the second end, the assist device comprising:
      an extraction feature at a first end of the assist device;
      an insertion feature in which a portion of the pin latching accessory is embedded, the insertion feature disposed at a second end of the assist device opposite the first end; and
      a middle section extending between the extraction feature and the insertion feature;
   wherein the extraction feature includes a surface extending away from a major plane of the middle section to form a gripping feature that is thicker than the middle section.

2. The retaining member of claim 1, wherein the assist device is a single molded piece.

3. The retaining member of claim 1, wherein the insertion feature is molded to the pin latching accessory.

4. The retaining member of claim 1, wherein the pin latching accessory comprises a locking element including a loop and the pin is insertable through the loop to prevent a rotation of the pin latching accessory away from the pin.

5. The retaining member of claim 4, wherein the assist device extends from the pin latching accessory at or near the locking element.

6. The retaining member of claim 5, wherein pulling on the assist device removes the pin from the locking element such that the pin latching accessory can be rotated relative to the pin.

7. A lock pin, comprising:
   a pin having a proximal end and a distal end;
   a latching accessory rotatably connected to the pin at the proximal end, the latching accessory including a loop defining a locking element configured to engage the pin at the distal end; and
   a pin assist device coupled to the latching accessory between the loop and the proximal end of the pin, the pin assist device comprising:
      an extraction feature;
      an insertion feature through which the latching accessory extends; and
      a middle section extending between the extraction feature and the insertion feature, the middle section having a thickness;
   wherein the extraction feature forms a gripping feature defining a tapered surface extending outward from the middle section such that the extraction feature has a thickness greater than the thickness of the middle section.

8. The lock pin of claim 7, wherein the pin assist device is molded to the latching accessory to form a single, unitary lock pin.

9. The lock pin of claim 7, wherein the middle section is planar.

10. The lock pin of claim 9, wherein the insertion feature has a thickness greater than the thickness of the middle section.

11. The lock pin of claim 7, wherein the latching accessory comprises a curved metal wire.

12. A lock pin, comprising:
   a pin;
   a latching accessory rotatably connected to the pin at a first end and selectively engaged with the pin at a second end; and
   a pin assist device coupled to the latching accessory between the first and the second end, the pin assist device comprising:
      an extraction feature at a first end of the pin assist device;
      an insertion feature at a second end of the pin assist device opposite the first end, the insertion feature coupled to the latching accessory; and
      a middle section extending between the extraction feature and the insertion feature,
   wherein the pin assist device is configured to disengage the latching accessory from the pin when the extraction feature is pulled;
   wherein the extraction feature includes a surface extending away from a major plane of the middle section to form a gripping feature that is thicker than the middle section.

13. The lock pin of claim 12, the latching accessory forms a locking feature at the second end, the pin being insertable through the locking feature.

14. The lock pin of claim 12, wherein the latching accessory comprises a flexible curved wire that deflects when the extraction feature is pulled.

15. The lock pin of claim 12, wherein the latching accessory comprises a metal wire and the pin assist device comprises a rubber material molded to the latching accessory.

* * * * *